United States Patent
Huang et al.

(10) Patent No.: US 11,215,535 B2
(45) Date of Patent: Jan. 4, 2022

(54) PREDICTIVE MAINTENANCE FOR ROBOTIC ARMS USING VIBRATION MEASUREMENTS

(71) Applicant: Hitachi, Ltd., Tokyo (JP)

(72) Inventors: Wei Huang, San Jose, CA (US); Chetan Gupta, San Mateo, CA (US); Ahmed Khairy Farahat, Santa Clara, CA (US)

(73) Assignee: Hitachi, Ltd., Tokyo (JP)

( * ) Notice: Subject to any disclaimer, the term of this patent is extended or adjusted under 35 U.S.C. 154(b) by 167 days.

(21) Appl. No.: 16/684,269

(22) Filed: Nov. 14, 2019

(65) Prior Publication Data
US 2021/0148791 A1 May 20, 2021

(51) Int. Cl.
*G01M 99/00* (2011.01)
*G05B 23/02* (2006.01)

(52) U.S. Cl.
CPC ....... *G01M 99/005* (2013.01); *G05B 23/0254* (2013.01); *G05B 23/0283* (2013.01)

(58) Field of Classification Search
CPC ............. G01M 99/005; G05B 23/0254; G05B 23/0283; G05B 2219/37351; G05B 2219/37435; G01H 1/00
See application file for complete search history.

(56) References Cited

U.S. PATENT DOCUMENTS

| | | | |
|---|---|---|---|
| 2002/0103626 A1* | 8/2002 | Zhao | G06F 17/148 702/190 |
| 2007/0088550 A1 | 4/2007 | Filev et al. | |
| 2007/0280006 A1* | 12/2007 | Aoyama | G06K 9/6251 365/189.15 |
| 2011/0246123 A1* | 10/2011 | DelloStritto | A61B 5/11 702/141 |
| 2021/0188554 A1* | 6/2021 | Kalouche | B25J 9/0093 |

OTHER PUBLICATIONS

Borgi et al. ,Data Analytics for Predictive Maintenance of Industrial Robots (Year: 2017).*
Extended European Search Report for related European Patent Application No. 20201155.7, dated Mar. 23, 2021 (8 pages).
Rehorn, A. "Fault diagnoses in machine tools using selective regional correlation" in Mechanical Systems and Signal Processing, Mar. 23, 2005, pp. 1221-1238, vol. 20.
Doguer, T. et al. "Vibration Analysis using Time Domain Methods for the Detection of small Roller Bearing Defects" SIRM 2009—8th International Conference on Vibrations in Rotating Machines, Feb. 23-25, 2009, pp. 23-25, Vienna, Austria (12 pages).
Plante, T. et al. "Faults Detection and Failures Prediction Using Vibration Analysis" IEEE AUTOTESTCON, 2015 (5 pages).

(Continued)

*Primary Examiner* — Mohammad K Islam
(74) *Attorney, Agent, or Firm* — Procopio, Cory Hargreaves & Savitch, LLP

(57) ABSTRACT

Example implementations described herein involve systems and methods for conducting feature extraction on a plurality of templates associated with vibration sensor data for a moving equipment configured to conduct a plurality of tasks, to generate a predictive maintenance model for the plurality of tasks, the predictive maintenance model configured to provide one or more of fault detection, failure prediction, and remaining useful life (RUL) estimation.

15 Claims, 13 Drawing Sheets

(56) References Cited

OTHER PUBLICATIONS

Singhal, A. et al. "Bearing Fault Detection in Induction Motor Using Fast Fourier Transform" IEEE Int. Conf. on Advanced Research in Engineering & Technology, Feb. 2013, pp. 190-194 (5 pages).

Cocconcelli, M. et al. "STFT Based Approach for Ball Bearing Fault Detection in a Varying Speed Motor" In Condition Monitoring of Machinery in Non-Stationary Operations, 2012, pp. 41-50 (10 pages).

Nizwan, C. K. E., et al. "A wavelet decomposition analysis of vibration signal for bearing fault detection." IOP Conference Series: Materials Science and Engineering, 2013, vol. 50 No. 1. IOP Publishing (10 pages).

Nikravesh, Y. et al. "Intelligent Fault Diagnosis of Bearings Based on Energy Levels in Frequency Bands Using Wavelet and Support Vector Machines (SVM)" Journal of Manufacturing and Materials Processing, Jan. 2019, pp. 1-14 (14 pages).

Extended European Search Report for related EP Application No. 20161292.6, dated Oct. 1, 2020 (10 pages).

Wang, Q. et al. "Remaining Useful Life Estimation Using Functional Data Analysis" Apr. 12, 2019, retrieved from https://arxiv.org/pdf/1904.06442.pdf (9 pages).

\* cited by examiner

| Template ID | Type | Task | Vibration Sensor Data |
|---|---|---|---|
| ID1 | Equip1 | Task1 | Data1 |
| ID2 | Equip1 | Task2 | Data2 |
| DI3 | Equip2 | Task3 | Data3 |
| ... | ... | ... | ... |

FIG. 8

PREDICTIVE MAINTENANCE FOR ROBOTIC ARMS USING VIBRATION MEASUREMENTS

BACKGROUND

Field

The present disclosure is generally directed to robotic arms, and more specifically, to utilizing vibration measurements in robotic arms to conduct predictive maintenance.

Related Art

Robotic arms are powered mechanical manipulators that can be controlled or reprogrammed to perform different operation tasks. Usually, its end point can move during the operation, and the motion behavior can be controlled by planning or programming.

For monitoring the movement and vibration of such equipment with movable mechanisms, a variety of vibration sensors have been utilized for different tasks and applications. Accelerometers are the most commonly used sensor type for vibration measurement in industrial machinery monitoring. When an accelerometer is attached to an object, it measures the acceleration, which is the rate of change of the velocity.

The vibration of the equipment can be measured by using the mounted vibration sensors like accelerometers. Vibration is defined as an oscillating motion about a position of reference. Some common examples of vibration measurement include monitoring a static object (e.g., electric motor, turbine, bearing), where the reference or equilibrium is stable. More complex examples of vibration measurements could be the monitoring of the motion of moving objects, for example, robotic arms.

Vibration signals analysis have been used in the related art for predictive maintenance tasks for industrial equipment, such as rotating machinery as well as equipment with bearings, motor and gearbox. Generally, the related art methods can be classified into three categories: (1) Time domain analysis; (2) Frequency domain analysis; and (3) Time-frequency domain analysis.

In order to monitor the health condition of equipment based on vibration data, the related art implementations aim to develop features (health indicators) from vibration data that represent the trends related to degradation condition from normal to failure based on domain expert knowledge or feature extraction methods. In time domain analysis, statistical features, such as mean, root mean square (RMS), variance, peak-to-peak value, skewness and kurtosis are extracted from the vibration signals to identify the differences between normal and failure conditions.

In related art implementations, time domain features extracted from accelerometer measurements are used to detect the roller bearing surface defects which generated the vibration structures differ from that of normal states. The defect can be identified by monitoring the difference in the vibration structures between the state with a small surface defect and the normal state.

In the related art, Fast Fourier Transform (FFT) is utilized in frequency domain analysis for predictive maintenance tasks, especially bearing fault detection. Given vibration signals measured on bearings, FFT measures the prominent frequency of the repetitive impulse period of certain faults due to the periodic contact between rolling elements and defective spot. Therefore, the bearing defects can be detected.

In related art implementations, the motor vibration signals are analyzed using spectrum analysis via FFT. By comparing the spectrum of the vibration data for three fault cases (Unbalance, mechanical looseness and bearing fault) to that of a healthy motor, the specific natural frequency corresponding with each fault condition are identified. Related art implementations show that certain faults in rotating mechanical systems can be determined using vibration analysis. By using FFT, the frequency spectrum of the vibration signals acquired from induction motor with and without ball bearing fault is compared. The characteristic frequencies that are related to the fault is observed and calculated.

FFT performed effectively in stationary periodic signals. However, an important limitation of FFT implementations is that the time varying characteristics for a given signal could not be provided. FFT can only provide the global spectrum, which works for stationary signals. For non-stationary signals, FFT could not provide the time information of the oscillations at different frequencies.

Analysis approaches with non-stationary vibration signals are utilized for health monitoring and predictive maintenance for equipment with very complex vibration measurements, such as robotic arms. In vibration signal analysis, the related art methods in time-frequency domain have been widely used and found to be effective in monitoring the non-stationary machinery vibration signals with transient signals or time-varying characteristics.

The short-time Fourier transform (STFT) is developed to overcome the limitation of FFT, which applies the FFT on a small segment of the overall signal each time by using a sliding window. Therefore, STFT is capable to capture the local frequency information and monitor the frequency change over time in a signal. A limitation of STFT is its inability to achieve high resolution simultaneously in both time domain and frequency domain, which is known as the uncertainty principle or the Heisenberg inequality.

In related art implementations, STFT is implemented for feature extraction for damage detection in ball bearings in a varying speed motor based on vibration measurements. The vibration signal is first segmented based on the speed profile of the motor and the STFT spectrograms are averaged for each cycle in the time-frequency domain to enhance the local fault indicators. The integration of the averaged STFT coefficients is used as indicators of damage.

Wavelets analysis is utilized in the related art to analyze signals with rapidly changing frequencies over time, which enables the capability to capture the local features, transient signals or time-varying characteristics. Wavelet analysis makes use of a window function with a varying/scaling size so that a series of time-frequency resolution can be achieved. The multiresolution property from the scaling in wavelet transform enables to provide larger temporal widths for lower frequencies and maintaining smaller temporal grids for higher frequencies. Therefore, wavelet transform is capable to capture features at different times and within different time windows by a series of decomposed components at different frequency scale.

Wavelet analysis on vibrational measurements from accelerometer is presented to be a useful tool in bearing condition monitoring, where the discrete wavelet transform (DWT) was utilized to decompose vibration signal at different frequency scales. Root mean square (RMS) for each decomposition level was calculated by referring to the vibrational energy retention at each decomposition level. Based on the result, the defective bearings show significant deviation in maintaining RMS value after a few levels of decomposition. In related art implementations, the wavelet packet decomposition and analysis of the energy in different frequency bands is used for the fault diagnosis in rolling bearings. A vibration signal is decomposed into different frequency bands using different types of wavelets and different features are extracted based on the analysis of signal energy (for example, average energy, energy difference between levels, . . . ) in different frequency bands. Support vector machines (SVM) was then used for faults classification. The result shows that the related art implementations can reliably identify different fault categories and the severities in rolling bearings.

SUMMARY

However, the above related art implementations have several challenges. For example, one challenge in related art implementations is the use of a simple thresholding mechanism or comparison mechanism to detect defects or failures. This thresholding or comparison can happen on one or more extracted features, such as the energy of the signal in time domain (e.g. vibration peaks), the extracted statistical features in time domain, frequency domain or time-frequency domain, and the signal energy levels at various frequencies on frequency spectrum.

Such related art implementations can generate many false alarms or easily miss important failures. This is because the vibration signals from a non-static robotic arm are usually noisy and complex. The deviation from the normal behavior of non-stationary equipment is typically characterized by a complex pattern over the vibration signals. This motivates the need for a more complex anomaly scoring function that could consider both the shape of the vibration signals and the complex oscillation information in comparison to the normal vibration signal.

Another challenge in the related art is the detection of anomalies in the vibration signal without considering the tasks that the equipment is performing. Related art implementations can generate many false alarms or easily miss important failures. The vibration measurements corresponding to different tasks or operations might be very different. The fault detection approach with fixed parameters might not work for equipment with dynamic operating conditions and various operation tasks. This motivates the need to build a library of template that capture the normal behavior for each task.

Aspects of the present disclosure involve a method, which can involve receiving vibration sensor data for a moving equipment configured to conduct a plurality of tasks; conducting feature extraction on the vibration sensor data to calculate the similarity coefficients between the vibration sensor data and a plurality of templates; inputting the similarity coefficients to a predictive maintenance model for the plurality of tasks, the predictive maintenance model configured to provide one or more of fault detection, failure prediction, and remaining useful life (RUL) estimation; wherein the conducting feature extraction on the vibration sensor data to calculate the similarity coefficients between the vibration sensor data and the plurality of templates involves selecting a reference template from the plurality of templates; conducting time-frequency decomposition on the reference templates and the vibration sensor data to generate component signals across a plurality of decomposition levels; and conducting similarity estimation on the component signals for each of the decomposition levels to generate similarity coefficients between the vibration sensor data and the reference template.

Aspects of the present disclosure involve a non-transitory computer readable medium, storing instructions for executing a process, the instructions involving receiving vibration sensor data for a moving equipment configured to conduct a plurality of tasks; conducting feature extraction on the vibration sensor data to calculate the similarity coefficients between the vibration sensor data and a plurality of templates; inputting the similarity coefficients to a predictive maintenance model for the plurality of tasks, the predictive maintenance model configured to provide one or more of fault detection, failure prediction, and remaining useful life (RUL) estimation; wherein the conducting feature extraction on the vibration sensor data to calculate the similarity coefficients between the vibration sensor data and the plurality of templates involve selecting a reference template from the plurality of templates; conducting time-frequency decomposition on the reference templates and the vibration sensor data to generate component signals across a plurality of decomposition levels; and conducting similarity estimation on the component signals for each of the decomposition levels to generate similarity coefficients between the vibration sensor data and the reference template.

Aspects of the present disclosure involve a system, which can involve means for receiving vibration sensor data for a moving equipment configured to conduct a plurality of tasks; means for conducting feature extraction on the vibration sensor data to calculate the similarity coefficients between the vibration sensor data and a plurality of templates; means for inputting the similarity coefficients to a predictive maintenance model for the plurality of tasks, the predictive maintenance model configured to provide one or more of fault detection, failure prediction, and remaining useful life (RUL) estimation; wherein the means for conducting feature extraction on the vibration sensor data to calculate the similarity coefficients between the vibration sensor data and the plurality of templates involves means for selecting a reference template from the plurality of templates; means for conducting time-frequency decomposition on the reference templates and the vibration sensor data to generate component signals across a plurality of decomposition levels; and means for conducting similarity estimation on the component signals for each of the decomposition levels to generate similarity coefficients between the vibration sensor data and the reference template.

Aspects of the present disclosure involve an apparatus communicatively coupled to a moving equipment configured to conduct a plurality of tasks, the apparatus involving a processor, configured to, receive vibration sensor data for a moving equipment configured to conduct a plurality of tasks; conduct feature extraction on the vibration sensor data to calculate the similarity coefficients between the vibration sensor data and a plurality of templates; input the similarity coefficients to a predictive maintenance model for the plurality of tasks, the predictive maintenance model configured to provide one or more of fault detection, failure prediction, and remaining useful life (RUL) estimation; wherein the processor is configured to conduct the feature extraction on the vibration sensor data to calculate the similarity coefficients between the vibration sensor data and the plurality of templates by selecting a reference template from the plurality of templates; conducting time-frequency decomposition on the reference templates and the vibration sensor data to generate component signals across a plurality of decomposition levels; and conducting similarity estimation on the component signals for each of the decomposition levels to generate similarity coefficients between the vibration sensor data and the reference template.

BRIEF DESCRIPTION OF DRAWINGS

FIG. 8 illustrates example management information, in accordance with an example implementation.

DETAILED DESCRIPTION

Figure 1:
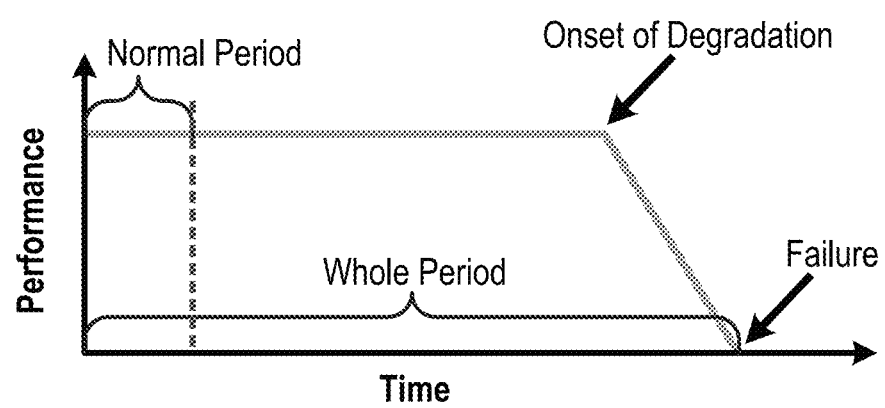
FIG. 1 illustrates an example simplified performance degradation curve of equipment, in accordance with an example implementation.

The following detailed description provides further details of the figures and example implementations of the present application. Reference numerals and descriptions of redundant elements between figures are omitted for clarity. Terms used throughout the description are provided as examples and are not intended to be limiting. For example, the use of the term "automatic" may involve fully automatic or semi-automatic implementations involving user or administrator control over certain aspects of the implementation, depending on the desired implementation of one of ordinary skill in the art practicing implementations of the present application. Selection can be conducted by a user through a user interface or other input means, or can be implemented through a desired algorithm. Example implementations as described herein can be utilized either singularly or in combination and the functionality of the example implementations can be implemented through any means according to the desired implementations.

Robotic arms are widely used in different fields of industries and with different applications. Vibration sensors are commonly mounted on the end point of the robotic arms to measure their movements and vibrations during their operation. Vibration measurements are usually delivered at high sampling frequency.

Robotic arms are not static. They are moving during the operation and operating conditions are different (e.g., loading and moving speed). Therefore, their vibration signals are complex, which are non-stationary, non-linear and have time-varying characteristics. For the monitoring of such a moving object, the vibration sensor measurement is a combination of oscillations at different rates with the equilibriums possibly changing over time. Sometimes, there are superposed non-stationary transient events. Many faults, such as cracks and fatigues inside the gearbox, could generate abnormal transients in the vibration signal due to abrupt vibration change when the damaged surface of faulty elements is engaged. Any failure could cause a change in machine vibration, and each of the defects and wear levels could have unique vibration signatures.

Therefore, it can be important to measure, monitor, and analyze the vibration of equipment for health monitoring and predictive maintenance. The vibration measurements can be used to identify the presence of internal damages or failures, and evaluate the performance of the equipment. Example implementations involve an algorithm for predictive maintenance for the robotic arms based on the vibration measurements. The algorithm utilizes two phases: learning phase and application phase.

FIG. 1 illustrates an example simplified performance degradation curve of equipment, in accordance with an example implementation. As illustrated in FIG. 1, over the whole history of the equipment, the performance of the equipment degrades until failure eventually after the onset of degradation. During the normal periods, the performance of the equipment maintains constant, however, once the onset of degradation occurs, the performance begins to degrade until failure occurs.

Figure 2:
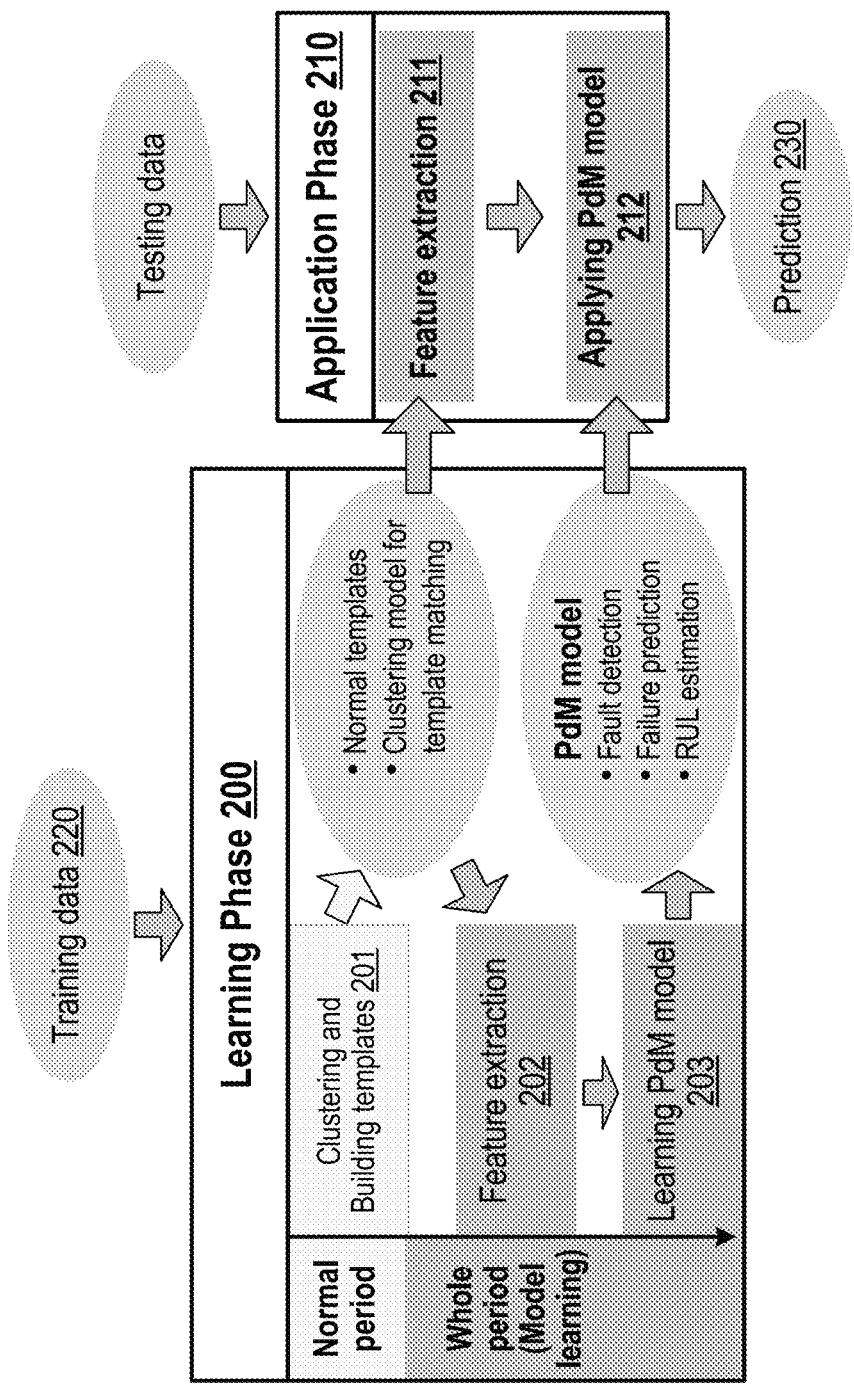
FIG. 2 illustrates an example process for the predictive maintenance solution based on vibration measurements, in accordance with an example implementation.

FIG. 2 illustrates an example process for the predictive maintenance solution based on vibration measurements, in accordance with an example implementation. There are three steps in learning phase 200: clustering and building templates 201, feature extraction 202 and learning the predictive maintenance (PdM) model 203.

In the step of clustering and building templates 201, the algorithm applies a clustering approach to the normal period of the training data 220 (e.g. measured during the early usage stage of the equipment, or the period after maintenance or repair) to capture the variability in the vibration signals by identifying the different clusters of movements, which possibly correspond to different tasks that the equipment is performing. For each cluster of vibration measurements, a number of representative templates that describe the normal behavior of that cluster are selected and included in the template set. In the clustering step, a set of templates as well as the clustering model are learned for the usage in the following step of feature extraction and learning PdM model. Further details are provided with respect to FIGS. 11(a) and 11(b).

In the step of feature extraction 202, the algorithm takes the whole set of training data (covers the measurement signals from normal state to failure state of the equipment) and applies a similarity estimation function to perform feature extraction. The similarity estimation function can calculate a set of similarity coefficients to represent the similarity between two vibration signals. In this step, for each vibration signal in the training data, the algorithm first assigns the right template as its ideal reference by applying the selecting a reference template process, then calculates the set of similarity coefficients between each vibration signal and its ideal reference as features. These similarity coefficients describe the deviation of each vibration signal from its ideal case at different time-frequency scale levels. By extrapolating the similarity coefficients measured between the current vibration signal and its corresponding ideal template, the current performance of the robotic arm system can be estimated.

In the step of learning PdM model 203, the algorithm uses the extracted similarity coefficients as features, together with corresponding labels generated from failure cases to build machine learning models for different PdM tasks including 1) Fault detection. 2) Failure prediction. 3) Remaining useful life estimation.

In this phase, a set of templates representing normal behavior of the equipment under different operations, the clustering model represented as the centroids of clusters, as well as the machine learning model for PdM tasks, are learned for the usage in the application phase 210.

Application phase 210 is the deployment stage of the algorithm for PdM of the robotic arms. In this phase, the algorithm estimates the current performance of the equipment given a current vibration measurement. For each current vibration signal, the algorithm takes the normal templates and clustering model for template matching, which are learned in the learning phase, to perform feature extraction 211 and output a set of similarity coefficients as features. Then, the machine learning model trained in the learning phase 200 for the associated PdM task is employed 212 to make prediction or estimation based on the similarity coefficients extracted from the current vibration signal.

As illustrated in FIG. 2, the example implementations are directed to a solution for predictive maintenance for robotic arms with vibration sensors mounted to measure the movement and vibration of the end point during their operation. The example implementations described herein provides a new similarity estimation function which can serve as a comprehensive anomaly scoring function based on the complex vibration measurements from the sensors mounted on the robotic arms. The vibration measurements are usually delivered at a high sampling frequency. The vibration signal measured at the end point of the robotic arm system can involve a general movement signature with superposed higher order vibration. The general movement signature describes the moving trajectory of the robotic arm during the operation. The higher order vibration is a combination of various oscillations at different rates, as well as superposed non-stationary transient events (with certain local time frequency characteristics). Any failure could introduce a change to the machine vibration signals compared to the vibrations measured when the equipment is normal. All defects and wear levels could involve corresponding unique vibration signatures that are different from the normal vibration measurements. The differences are the deviation from the normal measurements, which can involve global patterns over the vibration signals during the whole operation or just transient patterns with certain local time-frequency characteristics.

In example implementations, a solution for predictive maintenance for the robotic arms is provided, based on the complex vibration measurements with an innovative similarity estimation function which provide a comprehensive anomaly score calculation. The similarity estimation function is employed to take into account all possible operating conditions or tasks that the robotic arm is performing. As shown in the general process diagram in FIG. 2, the solution involves two phases: learning phase 200 and application phase 210. Training data 220 is used in the learning phase 200 to build vibration templates, vibration signal clustering model and PdM model. After learning phase 200 is completed, given a current vibration signal in application phase 210, the solution can provide an estimation/prediction 230 of the current performance of the equipment.

Training data set 220 used in learning phase 200 contains the vibration signals from a number of failure cases of the robotic arm systems, where vibration sensors are mounted to continuously measure their movements during their operations from normal state to failure state. In the training data set 220, the vibration signals measured during the normal periods are used in the step of clustering and building templates 201. The following steps of feature extraction 202 and building PdM model 203 are performed over the whole training data set to develop machine learning model for associated PdM task.

Figure 3:
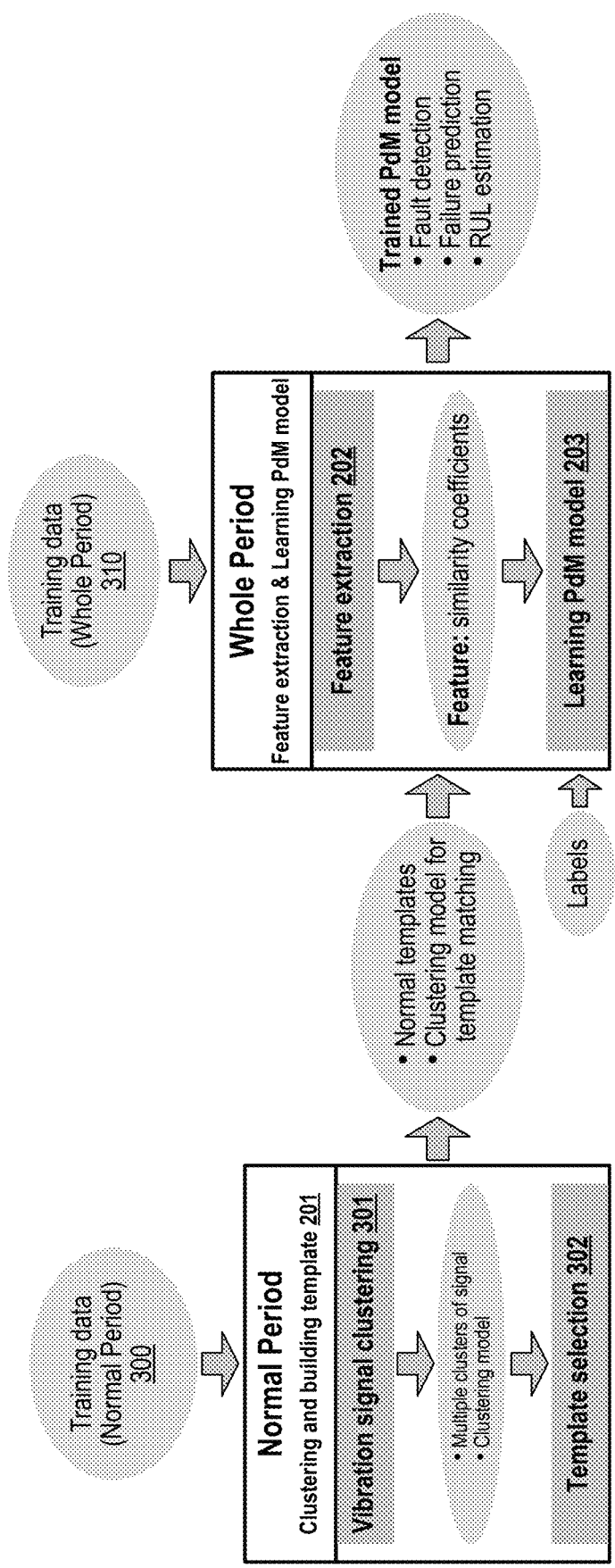
FIG. 3 illustrates an example process for the learning phase in the solution given the training set, in accordance with an example implementation.

FIG. 3 illustrates an example process for the learning phase in the solution given the training set, in accordance with an example implementation.

In the process of clustering and building templates 201, the normal period of the training data 300 (e.g. measured during the early usage stage of the equipment, or the period after maintenance or repair) is used to capture the variability in the vibration signals by identifying the different groups of movements, which possibly correspond to different tasks that the equipment is performing or different operating conditions. In clustering 301, the normal original multivariate vibration signals are vectorized to become one-dimensional vectors with equal number of elements. Then a clustering algorithm is applied to perform the grouping. The plurality of tasks that the moving equipment is configured to undergo can thereby derived/identified from the groups (e.g., each group is associated with a corresponding task based on the underlying labeled data during normal behavior). Then for each group of vibration measurements, a number of representative templates that describe the normal behavior of that group are selected to be included in the template set. The template selection 302 is based on a thresholding mechanism to incrementally add the vibration signals with maximum correlation to the existing templates less than a certain value. The reason of selecting multiple templates for each group is to allow some normal variation of each group of movements. In this step, a set of templates representing normal behaviors, as well as the clustering model represented as the centroids of clusters, are learned for the usage in the following step of feature extraction and learning PdM model.

Figure 4:
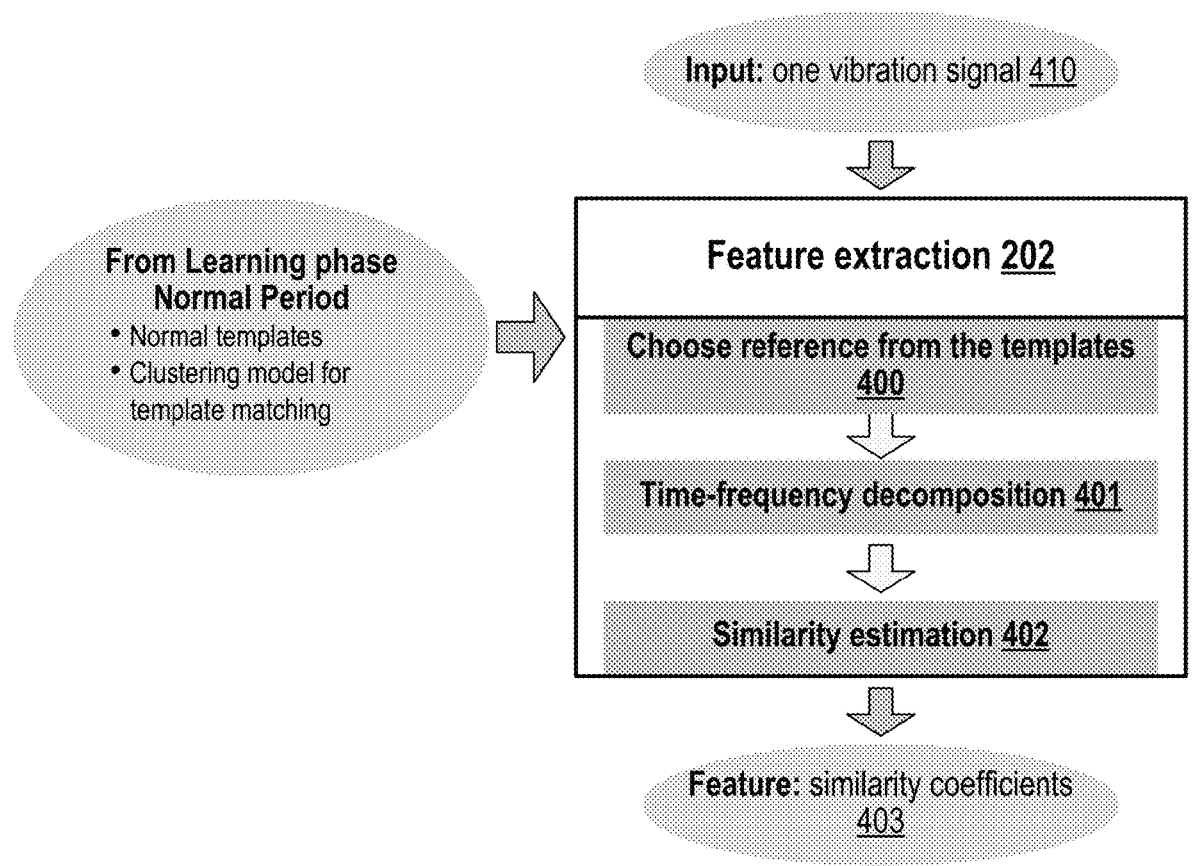
FIG. 4 illustrates an example feature extraction process for a given vibration signal, in accordance with an example implementation.

FIG. 4 illustrates an example feature extraction process for a given vibration signal, in accordance with an example implementation.

In the process for feature extraction 202, the algorithm takes the whole set of training data 310 (e.g., covers the measurement signals from normal state to failure state of the equipment) and applies a similarity estimation function to perform feature extraction. The similarity estimation function can calculate a set of similarity coefficients to represent the similarity between two vibration signals. For each vibration signal in the training data, the algorithm first assigns the right template as its ideal reference 400 by conducting template matching using the clustering model.

Then, the time-frequency decomposition 401 is applied to the vibration signal 410 and its ideal reference to decompose them to certain levels of component signals, wherein different levels carry information in different frequency scales representing different levels of detail information. The algorithm then compares the two original signals at each decomposition level by calculating the similarity coefficients at 402. There are two similarities calculated at each decomposed level in our solution: correlation coefficient and distance coefficient. Finally, the similarity coefficients at various levels are concatenated together to form a 1-dimensional vector of similarity coefficients 403. The similarity coefficients 403 are the extracted features which describe the deviation of each vibration signal from its ideal case at different time-frequency scale levels. By extrapolating the similarity coefficients measured between the current vibration signal and its corresponding ideal template, the current performance of the robotic arm system can be estimated.

In example implementations, any time-frequency decomposition technique can be applied. Discrete wavelet transformation is an example that can facilitate the decomposition. The methods that calculate the correlation and distance between two time series can be applied to estimate the correlation coefficient and distance. Cross-correlation coefficient is an example to calculate the correlation coefficient. Dynamic time warping is an example to estimate the distance coefficient.

For learning the PdM model 203, the algorithm uses the extracted similarity coefficients as features, together with corresponding labels to build machine learning models for PdM task including 1) Fault detection, 2) Failure prediction, and 3) Remaining useful life estimation.

When this phase is completed, a set of templates representing the normal behavior of the equipment under different operations, the clustering model, as well as the machine learning model for PdM tasks are learned for the usage in the application phase 210.

Figure 5:
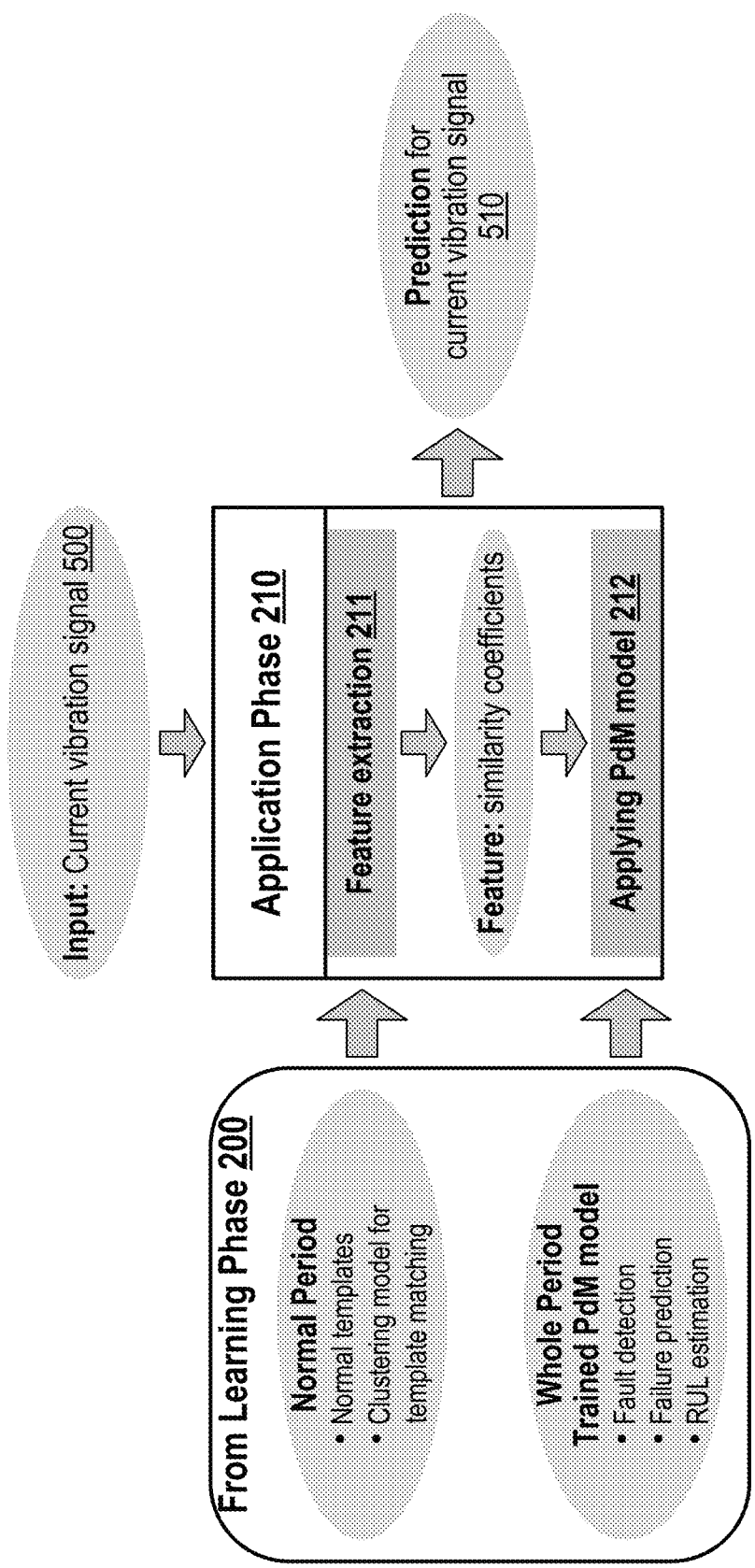
FIG. 5 illustrates a process for the application phase given a current vibration measurement signal, in accordance with an example implementation.

FIG. 5 illustrates a process for the application phase given a current vibration measurement signal, in accordance with an example implementation. Application phase 210 is the deployment stage of the algorithm for PdM of the robotic arms. In this phase, the algorithm estimates the current performance of the equipment given a current vibration measurement signal 500. For each current vibration signal 500, the algorithm takes the normal templates and clustering model for template matching, which are learned in the learning phase 200, to perform feature extraction 211 and output a set of similarity coefficients as features. Then, the machine learning model learned in the learning phase 200 for associated PdM tasks is applied 212 to provide a prediction 510 or estimation based on the similarity coefficients extracted from the current vibration signal.

Normally, the sensor measurements are high frequency univariate or multivariate time series with some pre-defined sampling frequency. Each vibration data file records the vibration measurement of the robotic arm during one operation process. These vibration data files may have different durations due to the recording breaking mechanism. The smart robotic arms usually have trigger signals about the start and end of an operation process so that the vibration measurements are segmented and saved into distinct files, with each file corresponding one cycle of the operation process. Each data file involves M-dimensional real-value measurements from M-dimensional vibration sensors mounted on the end point of the robotic arm, which can be represented as:

$$V=[V_1 \ldots V_i \ldots V_M]$$

Where each $V_i$ is a 1-dimensional series of vibration measurement with length N $$V_i=[v_{i,1} \ldots v_{i,j} \ldots v_{i,N}]$$

For example, a single Cartesian space 3-axis accelerometer mounted at the end point of the robotic arms will output Cartesian space 3-dimensional vibration measurements. Any higher order measurements measured from higher order vibration sensor or a combination of sensors could measure higher dimension vibration signals, depending on the desired implementation.

Figure 6:
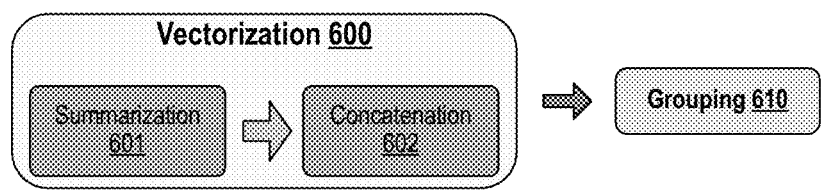
FIG. 6 illustrates an example of a vibration signal clustering approach, in accordance with an example implementation.

FIG. 6 illustrates an example of a vibration signal clustering approach, in accordance with an example implementation. Specifically, FIG. 6 illustrates an example of vibration signal clustering 301. The vibration signals corresponding to different tasks or operations of the robotic arm might be very different. The vibration signal measured at the end point of the robotic arm system involves a general movement signature with superposed higher order vibrations. The general movement signature describes the moving trajectory of the end point during one operation, which is used in the clustering approach to separate the vibration signals into different groups, possibly corresponding to different tasks or operations of the equipment. The clustering approach involves two stages: vectorization stage 600 and grouping stage 610. In vectorization stage 600, there are two steps as follows.

Summarization of the original M-dimensional vibration signals 600: In this step, a sliding averaging window is used to smooth over the variation of the vibration and extract the general movement trajectory from the original vibration signal as movement signature. The extracted movement signature for each M-dimensional original vibration signal is also M-dimensional with the same length as the original one.

Concatenation of the M-dimensional movement signature 601: In this step, the extracted M-dimensional movement signature is down-sampled to a fixed length n (e.g. n=50) in each dimension, and then concatenated to form a 1-dimension vector. The output of the vectorization step is the 1-dimensional vector with length N=M×n.

In grouping stage 610, the 1-dimension vectors from vectorization stage are the input to any unsupervised clustering algorithm (e.g., k-means) to perform grouping task in accordance with an example implementation.

Figure 7:
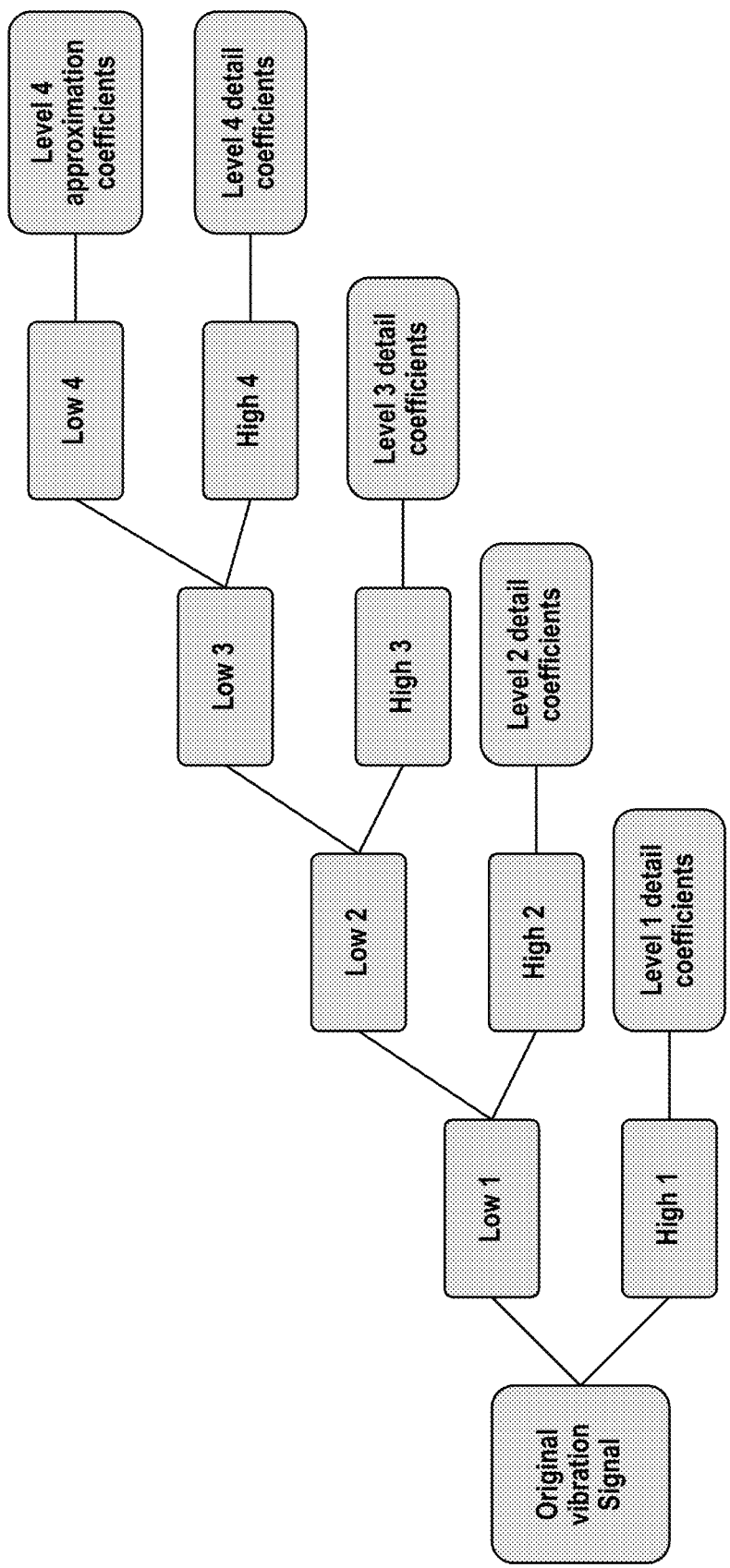
FIG. 7 illustrates a binary tree representation of the 4-level decomposition using DWT, in accordance with an example implementation.

FIG. 7 illustrates a binary tree representation of the 4-level decomposition using DWT, in accordance with an example implementation. For feature extraction 202, a similarity estimation function 402 is developed to calculate the similarity between two multivariate vibration signals. This similarity function 402 takes into account the complex patterns that exist in the vibration. The two vibration signals are first decomposed into various time-frequency scales.

For the time-frequency decomposition 401, wavelets analysis is employed to decompose the original vibration signal into multiple component signals within different frequency scales based on the multi-resolution scaling properties in wavelet transform. The transient signals which are buried in the complex original vibration signals could be extracted out from the background because of its distinct time-frequency characteristics. These transient segments may only be present at certain decomposition levels and are possibly related to failures. The decomposition can be represented as filter bank in the format of binary tree as shown in FIG. 7. The following example as illustrated in FIG. 7 is directed to DWT, however, other methods for signal time-frequency decomposition can be utilized depending on the desired implementation. One of ordinary skill in the art would understand that the following equations and techniques can be modified to facilitate non-DWT based methods (e.g., continuous wavelet transform, wavelet packet decomposition) in accordance with the desired implementation.

Mathematically, given a 1-dimensional vibration measurement $V_i$, i=(1, . . . , M), $f_1$ is the function defined to perform the L-levels time-frequency decomposition $$f_1(V_i) = [V_i^1, \ldots, V_i^l, \ldots, V_i^{L+1}], i=(1,\ldots,M)$$

The lengths of the component signals at different decomposition levels are different. Here, $V_i^{L+1}$ and $V_i^L$ are defined as the approximation coefficients and detail coefficients at the highest decomposition level which have shortest length and represent the information at lowest frequency scale. The length of $V_i^{L+1}$ and $V_i^{L+1}$ are equal and depending on the length of $V_i$ and the maximum decomposition level L.

$$\text{length}(V_i^{L+1}) = \text{length}(V_i^L) = \text{length}(V_i)/2^L$$

Each preceding level corresponds to higher frequency scale and doubles the length of the succeeding level, which carries more detailed information about the original signal. The lowest level $V_i^1$ has the half of length of the original signal $V_i$, which corresponds to highest frequency scale and carries the most detailed information.

Generally, the similarity measurement between two data series can be defined as a function Similarity(X, Y), where X and Y are two different data series of the same type of data or measurement. The value calculated by the function usually lies between 0 and 1. The bigger the value is, the higher the similarity is between the two data series, and vice versa. Correlation and distance capture different aspects of the similarity between two data series, which can be applied to measure the similarity between the vibration signals.

Cross-correlation can be utilized to measure the degree to which two data series are correlated. It is known as a sliding inner-product between two data series and measures of similarity as a function(Cross_C) of the displacement of one series $V_a$ relative to the other $V_b$.

$$\text{Cross\_C}(V_a, V_b)[n] = \sum_{g=-\infty}^{\infty} V_a[g-n]V_b[g]$$

Usually, the highest coefficient is selected as the cross-correlation coefficient.

$$C = \max(\text{Cross\_C}(V_a, V_b))$$

Cross-correlation estimates the similarity as the degree of correlation between two data series. Cross-correlation of two vibration signals will capture the similarity of their shapes and change points.

A limitation in cross-correlation is that it may not work properly in the cases where the target sequence is normally elongated/compressed, or "warped", relative to the template. Dynamic time warping (DTW) can be used for matching temporal sequences, which can effectively determine the similarity between two series under the circumstances of amplitude stretching or translation, and the bending/stretching of time axis. The goal in DTW is to determine the optimal path between two data series by allowing them to be warped nonlinearly along the time axis. One advantage of using DTW is that it can handle two data series with different lengths. A simple example of applying DTW is to recognize a word even though it is spoken at different speeds. In the vibration measurements for robotic arms, their motion profiles corresponding to different tasks or operating conditions do not necessarily have the same length.

As illustrated from FIG. 4, the feature extraction 202 can involve time-frequency decomposition 401 and similarity estimation 402 as follows:

Given two 1-D vibration signals: $V_i^a$ and $V_i^b$ measured from same type of vibration sensor. i is representing the $i^{th}$-dimension of vibration signal. In practice, the vibration signals could be univariate with 1-D sensor or multivariate with sensors measuring the vibration in a higher-dimensional space. The similarity measure function is defined as $f$:

$$f(V_i^a, V_i^b) = f_2(f_1(V_i^a), f_1(V_i^b)) = [c_{i,1}^{ab}, \ldots, c_{i,L}^{ab}, d_{i,1}^{ab}, \ldots, d_{i,L}^{ab}], i=(1,\ldots,M)$$

Where $f_1$ is the function defined in previous section which performs time-frequency decomposition to decompose a vibration signals into L-levels of component signals at different time-frequency resolution scales.

Here, $f_2$ combines the two similarity estimation methods: correlation and distance discussed in the previous section. Function $f_2$ estimates the similarities at each decomposition level respectively by taking the component signals $V_{i,l}^a$ and $V_{i,l}^b$, which are corresponding to the two data series $V_i^a$ and $V_i^b$ respectively $$f_2(V_{i,l}^a, V_{i,l}^b) = [C(V_{i,l}^a, V_{i,l}^b), D(V_{i,l}^a, V_{i,l}^b)], l=1,\ldots,L$$

As a summary, function $f$ takes two 1-D vibration signals measured from same type of sensor as input, performs wavelet decomposition (L-level) for both, then computes the cross-correlation coefficient $c_{i,l}^{ab}$ and scaled distance coefficients $d_{i,l}^{ab}$ at each decomposition level l respectively.

Once the feature extraction is conducted 202, machine learning can be applied to learn the PdM model at 203 to determine functions for fault detection, failure prediction, and RUL estimation to generate prediction 230 once applied.

For the fault detection aspect of the PdM model, when PdM model is applied 212 to a set of vibration measurements 500 (e.g., accelerometers in 3D axis for robotic arm, . . . ), the fault detection aspect of the PdM model detect the existence of faults (e.g., fault in reduction gear) in the equipment for prediction 230.

After fault detection, the PdM model estimates the likelihood of system failure within a predefined time window (e.g., deviation of the vibration from the ideal case at certain level indicates that there is a 70% probability that the gearbox will fail in 2 days) to provide the failure prediction in prediction 230.

After fault detection, the PdM model estimates the remaining time before system failure (e.g., deviation of the vibration from the ideal case at certain level indicates that the gearbox will fail after 15 days) to provide the RUL estimation prediction in prediction 230.

The machine learning process for the fault detection, failure prediction, and estimating RUL are explained as follows.

Fault Detection

Problem: Given the vibration signal of the current operation process of the robotic arm, represented as $V^c$, estimate current performance of the robotic arm. $V^c$ is a M-dimensional multivariate signal.

Solution:

1. Represent the current vibration $V^c$ as a set of similarity coefficients by applying the similarity estimation function to the current vibration signal and the corresponding template. Both are M-dimensional.

$$S_i^{c,t} = f(V_i^t, V_i^c) = [c_{i,1}^{c,t}, \ldots, c_{i,L}^{c,t}, d_{i,1}^{c,t}, \ldots, d_{i,L}^{c,t}], i=(1,\ldots,M)$$

$$S^{c,t} = [S_1^{c,t}, \ldots, S_i^{c,t}, \ldots S_M^{c,t}], i=(1,\ldots,M)$$

2. Current performance indicator P is quantified by averaging all the coefficients F $$P_c = \frac{1}{2ML}\left(\sum_{i=1}^{M}\sum_{l=1}^{L} c_{i,l} + \sum_{i=1}^{M}\sum_{l=1}^{L} d_{i,l}\right)$$

-continued $P_c$

3. Generate threshold for P, create alerts/fault events when P drops below the threshold. These events could be verified by domain experts to find their relationship with failures Failure Prediction Problem: Given the vibration signal corresponding to the current operation process of the robotic arm, represented as $V^c$, estimate the likelihood of system failure within a predefined time window $\tau$.

Solution:

1. Represent the current vibration $V^c$ as a set of similarity coefficients by applying the similarity estimation function to the current vibration signal and the corresponding template. Both are M-dimensional.

$$S_i^{c,t} = f(V_i^t, V_i^c) = [c_{i,1}^{c,t}, \ldots, c_{i,L}^{c,t}, d_{i,1}^{c,t}, \ldots, d_{i,L}^{c,t}], i=(1,\ldots,M)$$

$$S^{c,t} = [S_1^{c,t}, \ldots, S_i^{c,t}, \ldots S_M^{c,t}], i=(1,\ldots,M)$$

2. Assign labels based the failure time ($t_f$) and prediction time window ($\tau$).

$$Y=[y_1, \ldots, y_t, \ldots, y_{t_f}]$$

$$y_t=0, (t=1, \ldots, t_f-\tau)$$

$$y_t=1, (t=t_f-\tau+1, \ldots, t_f)$$

3. Take $S^{c,t}$ as features and Y as labels to train a classification model for failure prediction.

RUL Estimation

Problem: Given the vibration signal corresponding to the current operation process of the robotic arm, represented as $V^c$, estimate the remaining time before system failure.

Solution:

1. Represent the current vibration $V^c$ as a set of similarity coefficients by applying the similarity estimation function to the current vibration signal and the corresponding template. Both are M-dimensional.

$$S_i^{c,t} = f(V_i^t, V_i^c) = [c_{i,1}^{c,t}, \ldots, c_{i,L}^{c,t}, d_{i,1}^{c,t}, \ldots, d_{i,L}^{c,t}], i=(1,\ldots,M)$$

$$S^{c,t} = [S_1^{c,t}, \ldots, S_i^{c,t}, \ldots S_M^{c,t}], i=(1,\ldots,M)$$

2. Assign labels based the failure time ($t_f$)

$$Y=[y_1, \ldots, y_t, \ldots, y_{t_f}], y_t=t_f-t$$

3. Take $S^{c,t}$ as features and Y as labels to train a regression model for RUL estimation.

FIG. 8 illustrates example management information, in accordance with an example implementation. Specifically, FIG. 8 illustrates an example of the template structure, in accordance with an example implementation. As illustrated in FIG. 8, each of the generated templates can include template identifier (ID), the type of moving equipment that was utilized, the task that the equipment was conducting during the recording of the vibration sensor data, and the vibration sensor data. Each type of moving equipment (e.g., moving arm, processing equipment, conveyor belt, etc.) conducts one or more tasks (e.g., loading, unloading, etc.) depending on the operations of the factory. The vibration sensor data can be the data recorded while the various moving equipment was scheduled to conduct such tasks in the factory. The type of moving equipment can encompass one or more moving equipment of the same type operating in the factory, depending on the desired implementation.

Figure 9:
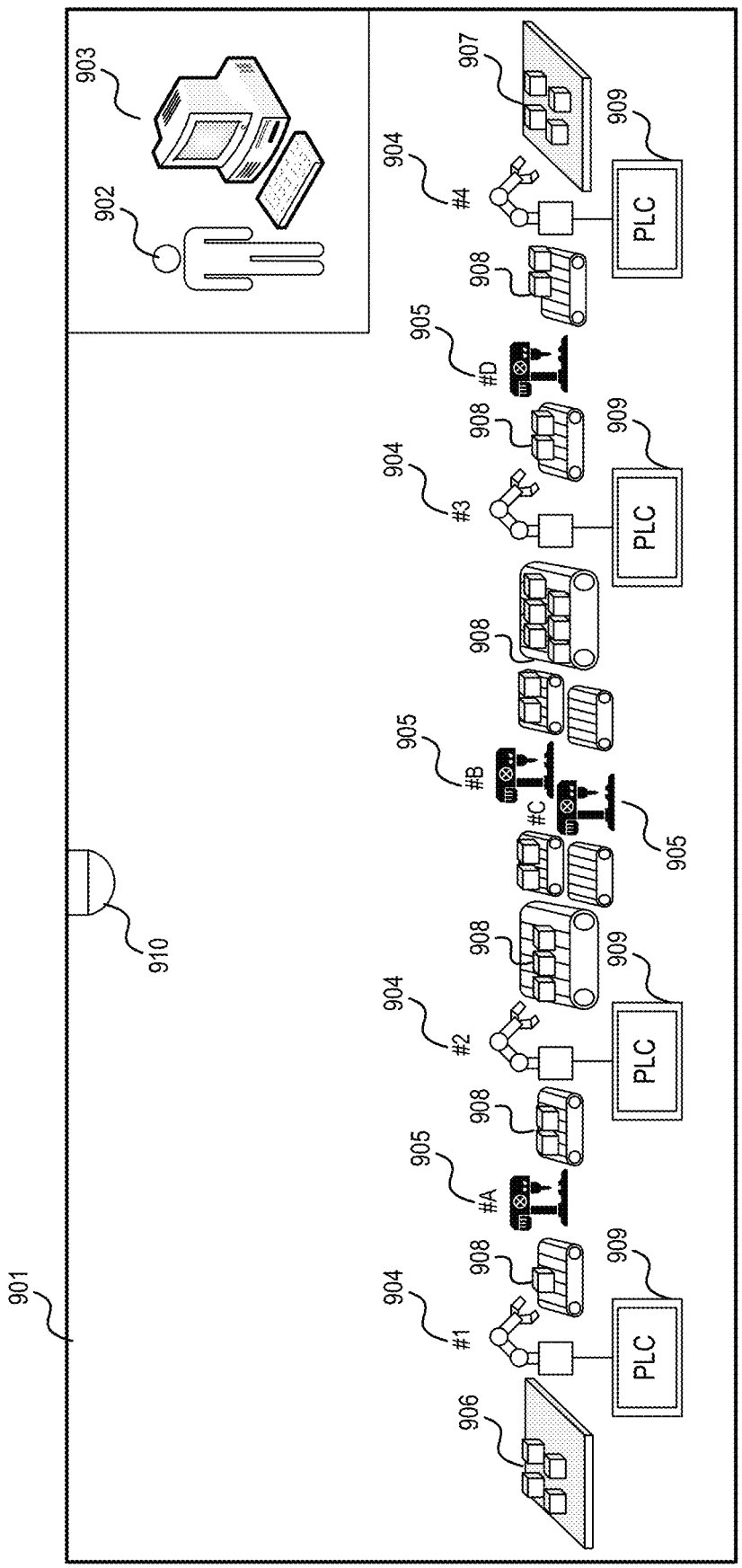
FIG. 9 illustrates an example physical structure of the system, in accordance with an example implementation.

FIG. 9 illustrates an example physical structure of the system, in accordance with an example implementation. In a factory 901, there are lines including one or more moving equipment, such as processing equipment 905 and robotic arms 904 that are configured to execute manufacturing processes such as loading components, unloading components, assembling components, and so on. For example, example manufacturing processes can involve processes in which equipment 905 processes products 908 and robotic arms 904 carry products 908 in accordance with a schedule. Multiple kinds or types of products may be processed at the same time, depending on the desired implementation. Robotic arms 904 and equipment 905 can be controlled by Programmable Logic Controllers (PLCs) 909 to perform one of a plurality of tasks. Workers 902 dispatch due date and scheduling policies to computing device 903 which is connected to programmable logic controllers 909, thereby communicatively coupling the computing device 903 to the moving equipment via the corresponding PLC and any network in accordance with the desired implementation. In lines, loading products 906 and unloading products 907 are managed by production management systems, in accordance with an example implementation. Depending on the desired implementation, a camera system 910 may also monitor the factory floor 901.

In example implementations, each of the moving equipment (processing equipment 905, robotic arms 904) have one or more vibration sensors attached to them, which provide sensor data to the computing device 903 via a separate network to the network connected to the PLCs, or with the same network as the PLCs depending on the desired implementation. Such vibration sensor data may be stored in the memory of the computing device 903 as batch or streaming data, or can be stored in a database configured to be accessible by the computing device 903.

Figure 10:
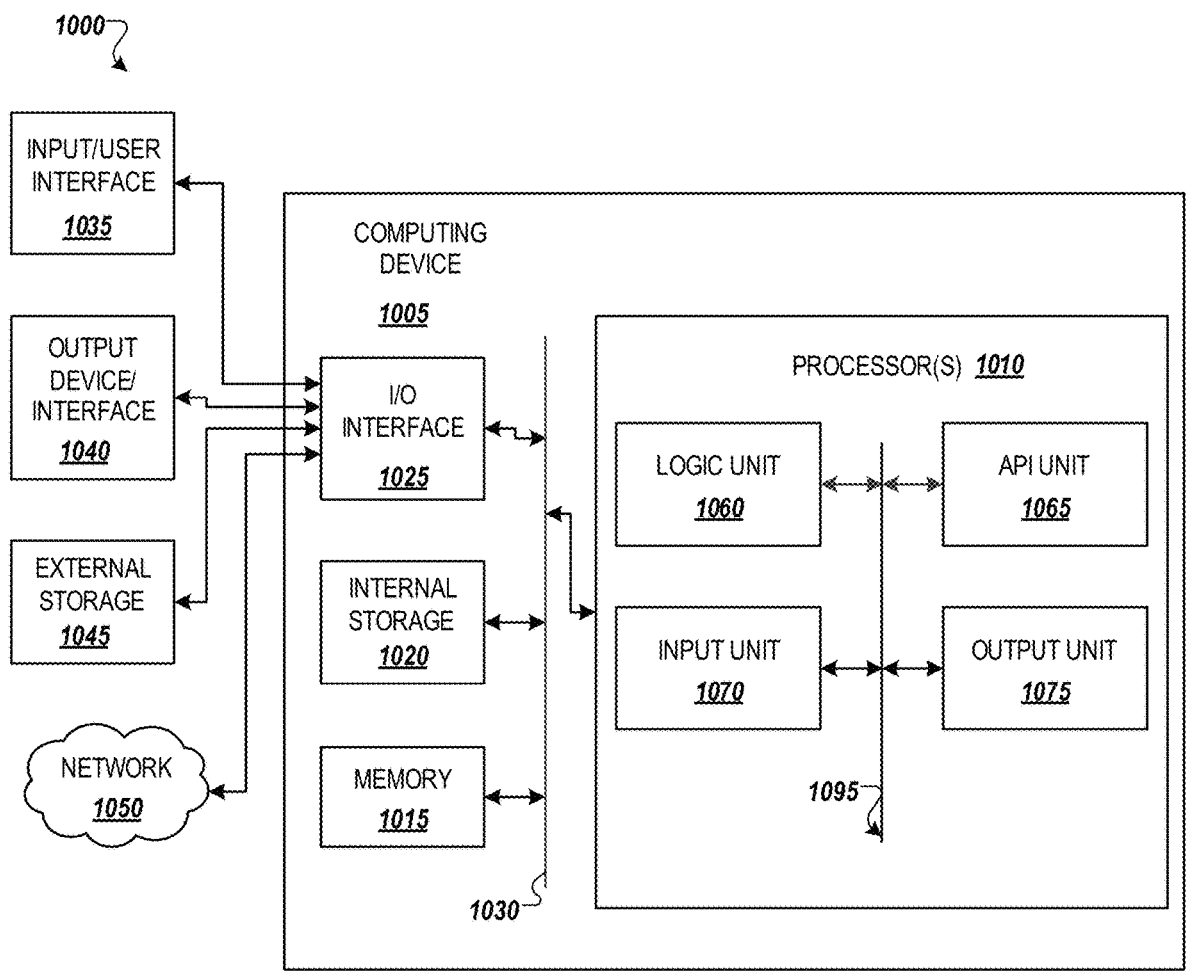
FIG. 10 illustrates an example computing environment with an example computer device suitable for use in some example implementations.

FIG. 10 illustrates an example computing environment with an example computer device suitable for use in some example implementations, such as a computing device 903 as illustrated in FIG. 9. In such an example implementation, the computer device 903 is connected to one or more programmable logic controllers (PLCs) associated with one or moving equipment on a factory floor over a network as illustrated in FIG. 9.

Computer device 1005 in computing environment 1000 can include one or more processing units, cores, or processors 1010, memory 1015 (e.g., RAM, ROM, and/or the like), internal storage 1020 (e.g., magnetic, optical, solid state storage, and/or organic), and/or I/O interface 1025, any of which can be coupled on a communication mechanism or bus 1030 for communicating information or embedded in the computer device 1005. I/O interface 1025 is also configured to receive images from cameras or provide images to projectors or displays, depending on the desired implementation.

Computer device 1005 can be communicatively coupled to input/user interface 1035 and output device/interface 1040. Either one or both of input/user interface 1035 and output device/interface 1040 can be a wired or wireless interface and can be detachable. Input/user interface 1035 may include any device, component, sensor, or interface, physical or virtual, that can be used to provide input (e.g., buttons, touch-screen interface, keyboard, a pointing/cursor control, microphone, camera, braille, motion sensor, optical reader, and/or the like). Output device/interface 1040 may include a display, television, monitor, printer, speaker, braille, or the like. In some example implementations, input/user interface 1035 and output device/interface 1040 can be embedded with or physically coupled to the computer device 1005. In other example implementations, other computer devices may function as or provide the functions of input/user interface 1035 and output device/interface 1040 for a computer device 1005.

Examples of computer device 1005 may include, but are not limited to, highly mobile devices (e.g., smartphones, devices in vehicles and other machines, devices carried by humans and animals, and the like), mobile devices (e.g., tablets, notebooks, laptops, personal computers, portable televisions, radios, and the like), and devices not designed for mobility (e.g., desktop computers, other computers, information kiosks, televisions with one or more processors embedded therein and/or coupled thereto, radios, and the like).

Computer device 1005 can be communicatively coupled (e.g., via I/O interface 1025) to external storage 1045 and network 1050 for communicating with any number of networked components, devices, and systems, including one or more computer devices of the same or different configuration. Computer device 1005 or any connected computer device can be functioning as, providing services of, or referred to as a server, client, thin server, general machine, special-purpose machine, or another label.

I/O interface 1025 can include, but is not limited to, wired and/or wireless interfaces using any communication or I/O protocols or standards (e.g., Ethernet, 802.11x, Universal System Bus, WiMax, modem, a cellular network protocol, and the like) for communicating information to and/or from at least all the connected components, devices, and network in computing environment 1000. Network 1050 can be any network or combination of networks (e.g., the Internet, local area network, wide area network, a telephonic network, a cellular network, satellite network, and the like).

Computer device 1005 can use and/or communicate using computer-usable or computer-readable media, including transitory media and non-transitory media. Transitory media include transmission media (e.g., metal cables, fiber optics), signals, carrier waves, and the like. Non-transitory media include magnetic media (e.g., disks and tapes), optical media (e.g., CD ROM, digital video disks, Blu-ray disks), solid state media (e.g., RAM, ROM, flash memory, solid-state storage), and other non-volatile storage or memory.

Computer device 1005 can be used to implement techniques, methods, applications, processes, or computer-executable instructions in some example computing environments. Computer-executable instructions can be retrieved from transitory media, and stored on and retrieved from non-transitory media. The executable instructions can originate from one or more of any programming, scripting, and machine languages (e.g., C, C++, C #, Java, Visual Basic, Python, Perl, JavaScript, and others).

Processor(s) 1010 can execute under any operating system (OS) (not shown), in a native or virtual environment and can be in the form of physical hardware processors such as Central Processing Units (CPUs) or a combination of software and hardware processors. One or more applications can be deployed that include logic unit 1060, application programming interface (API) unit 1065, input unit 1070, output unit 1075, and inter-unit communication mechanism 1095 for the different units to communicate with each other, with the OS, and with other applications (not shown). The described units and elements can be varied in design, function, configuration, or implementation and are not limited to the descriptions provided.

In some example implementations, when information or an execution instruction is received by API unit 1065, it may be communicated to one or more other units (e.g., logic unit 1060, input unit 1070, output unit 1075). In some instances, logic unit 1060 may be configured to control the information flow among the units and direct the services provided by API unit 1065, input unit 1070, output unit 1075, in some example implementations described above. For example, the flow of one or more processes or implementations may be controlled by logic unit 1060 alone or in conjunction with API unit 1065. The input unit 1070 may be configured to obtain input for the calculations described in the example implementations, and the output unit 1075 may be configured to provide output based on the calculations described in example implementations.

Memory 1015 is configured to store the generated templates for the factory as illustrated in FIG. 8, to provide to processor(s) 1010.

Processor(s) 1010 can be configured to conduct feature extraction on a plurality of templates associated with vibration sensor data received from the moving equipment, to generate a predictive maintenance model for the plurality of tasks, the predictive maintenance model configured to provide one or more of fault detection, failure prediction, and remaining useful life (RUL) estimation as illustrated in FIGS. 2 to 5.

Processor(s) 1010 can be configured to generate the plurality of templates, each of the plurality of templates being assigned with a task from the plurality of tasks while the moving equipment is operating at a normal condition as illustrated in FIG. 8 and at 201 of FIGS. 2 and 3. For example, processor(s) 1010 can be further configured to generate the plurality of templates by clustering the vibration sensor data, the clustering involving vectorizing a normal period of the vibration sensor data into a plurality of vectors; and grouping the plurality of vectors through execution of an unsupervised clustering algorithm as illustrated in FIG. 3 and FIG. 6.

Depending on the desired implementation, the moving equipment can be a robotic arm as illustrated in FIG. 9.

In accordance with the application phase as well as FIGS. 4 to 7 as described herein, the processor(s) 1010 can be configured to receive vibration sensor data for a moving equipment configured to conduct a plurality of tasks; conduct feature extraction on the vibration sensor data to calculate the similarity coefficients between the vibration sensor data and a plurality of templates; input the similarity coefficients to a predictive maintenance model for the plurality of tasks, the predictive maintenance model configured to provide one or more of fault detection, failure prediction, and remaining useful life (RUL) estimation; and conduct the feature extraction on the plurality of templates associated with the vibration sensor data for the moving equipment configured to conduct a plurality of tasks, to generate the predictive maintenance model for the plurality of tasks by selecting a reference template from the plurality of templates as illustrated at 401 of FIG. 4, conducting time-frequency decomposition on the reference template and the vibration sensor data to generate component signals across a plurality of decomposition levels as illustrated at 402 of FIG. 4 and FIG. 6; conducting similarity estimation on the component signals for each of the decomposition levels to generate similarity coefficients between the vibration sensor data and the reference template as illustrated at 402 of FIG. 4; and utilizing machine learning on the similarity coefficients to generate the predictive maintenance model as described with respect to FIGS. 4-7. As described with respect to 401 of FIG. 4, the selecting the reference template from the plurality of templates can be based on a template matching from clustering of the vibration sensor data.

Figure 11A:
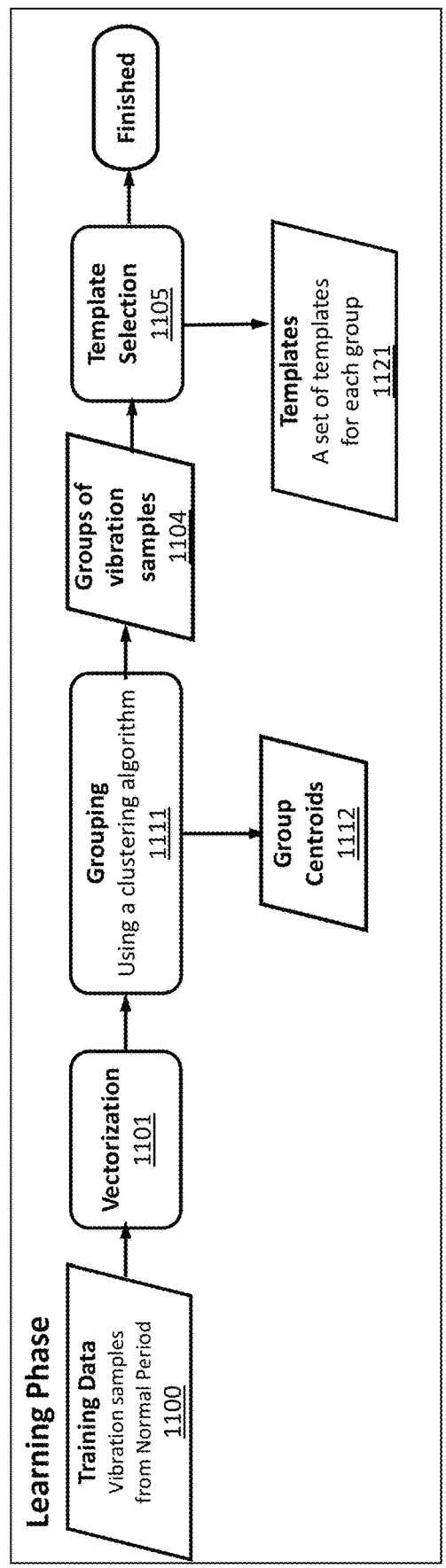
FIGS. 11(a) and 11(b) illustrate an example flow for selecting a reference template for the learning phase and the application phase, in accordance with an example implementation.
Figure 12:
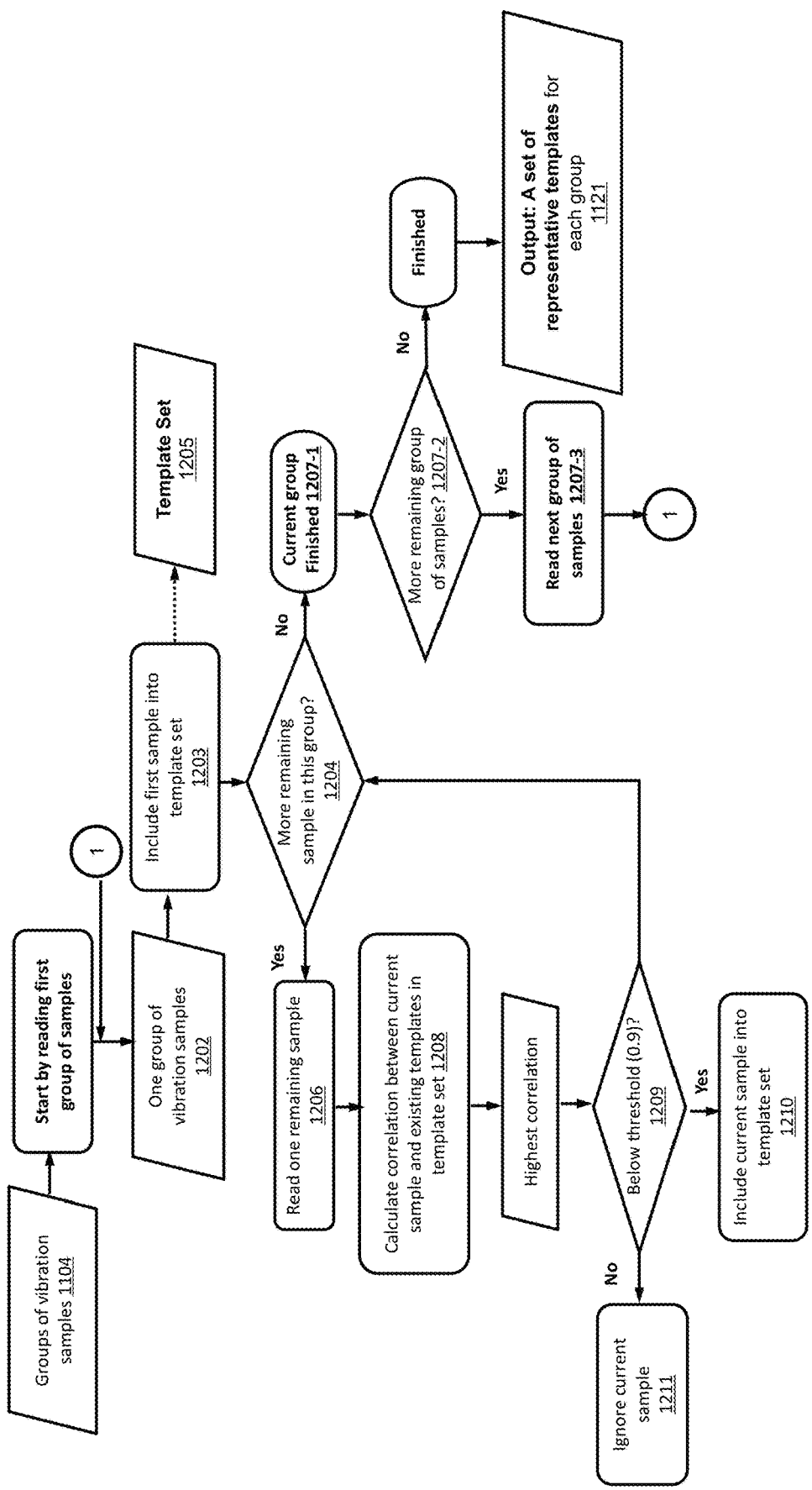
FIG. 12 illustrates an example flow for template selection, in accordance with an example implementation.

In accordance with the learning phase as illustrated in FIG. 11(a) and the template selection as illustrated in FIG. 12, the plurality of templates are a group of templates selected from a plurality of groups generated from a clustering process, the group of templates selected based on a determination of the group from the plurality of groups having a nearest centroid to the vibration sensor data as shown at 1110.

Figure 11B:
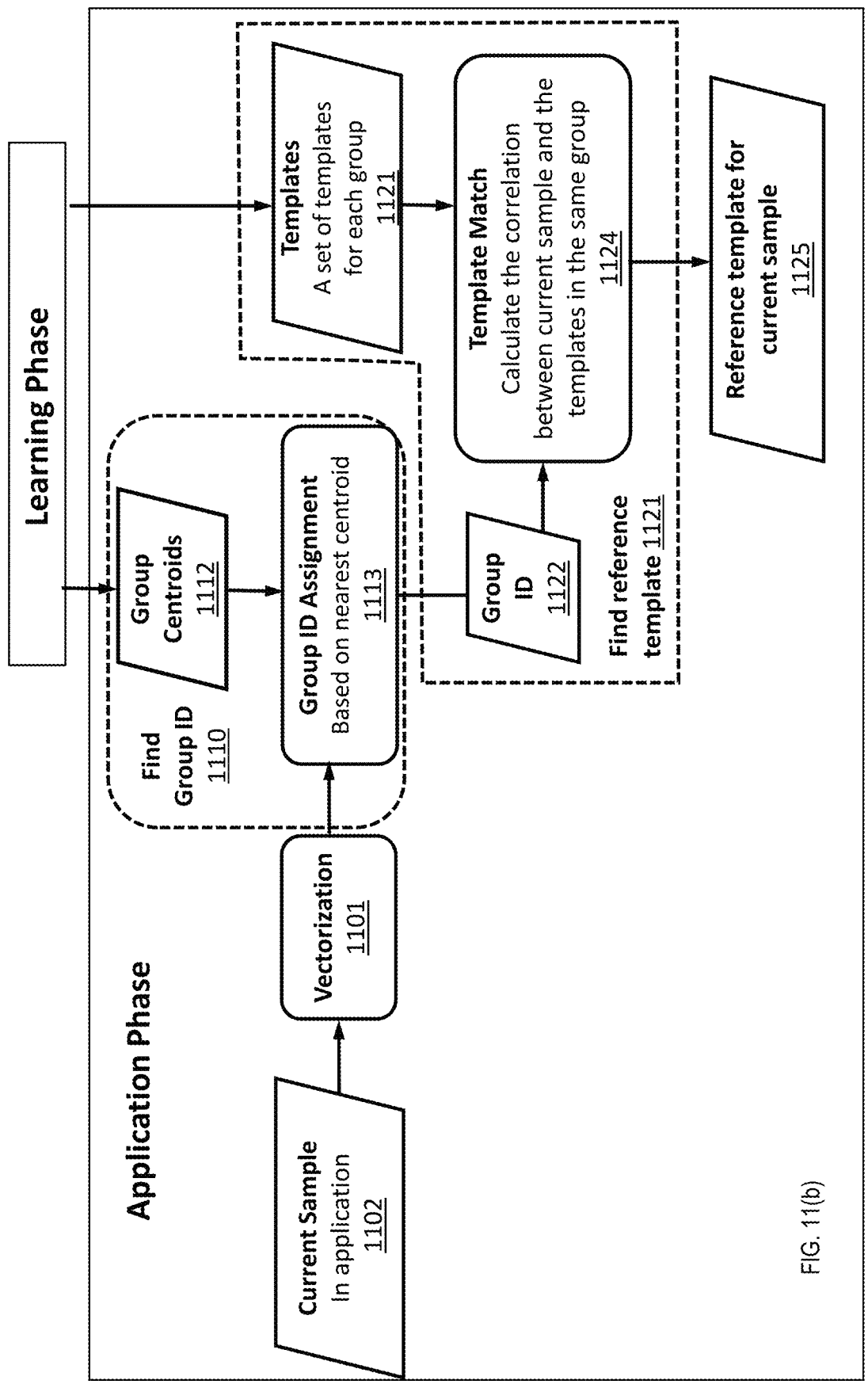

As illustrated at 1120 of FIG. 11(b), processor(s) 1010 can be configured to select the reference template from the plurality of templates by calculating a correlation between the vibration sensor data and each of the plurality of templates, and selecting one of the plurality of templates having a highest correlation as the reference template.

As illustrated in FIG. 12, processor(s) 1010 can be configured to, for each of the plurality of groups generated from the clustering process, select one or more samples from vibration data samples of the moving equipment operating at normal condition for utilization as the plurality of templates for the each of the plurality of groups. For example, processor(s) 1010 can be configured to select the one or more samples from vibration data samples of the moving equipment operating at normal condition for utilization as the plurality of templates for the each of the plurality of groups based on a correlation of the one or more samples to other samples in the each of the plurality of groups as illustrated in the flow diagram of template selection 1105 of FIG. 12.

FIGS. 11(a) and 11(b) illustrate an example flow for selecting a reference template for the learning phase and the application phase, in accordance with an example implementation. In the example implementation of FIG. 11(a) and FIG. 11(b), there are two aspects for selecting the reference template, namely finding the group ID 1110 of the input vibration sample based on the grouping of training data vibration samples from using a clustering algorithm, and finding the reference template based 1120 based on the group ID of the input vibration sample and the set of representative templates provided for each known group. FIG. 11(a) illustrates the learning phase aspect of template matching, and FIG. 11(b) illustrates the application phase aspect of the template matching.

During the learning phase of FIG. 11(a), the training data 1100 is provided for vectorization 1101. Specifically, the training data involves the vibration samples of the moving equipment during the normal period of operation 1100. Such samples are vectorized 1101 and then grouped by using a clustering algorithm 1111 as described herein. The results from the grouping 1111 involve groups of vibration samples 1104 and group centroids 1112 which indicates the centroids of each of the groups of vibration samples. The group centroids 1112 will be utilized to provide a group ID assignment based on the nearest centroid 1113. The groups of vibration samples 1104 are utilized in a template selection 1105 which selects representative templates for each group 1121 through a process as illustrated in FIG. 12. The templates used for each group 1121 can be determined through a threshold set in accordance with the desired implementation. The templates for the each group 1121 will be used in a correlation calculation 1124 of the actual vibration sample to determine the reference template.

During the application phase of FIG. 11(b), the system receives a vibration sample 1102 and processes the vibration sample through a vectorization process 1101. Once vectorized, the vectorized sample is assigned a group ID from the various based on the nearest centroid 1113. The group ID assigned to the sample is the group having the nearest centroid to the vectorized sample.

Once the group ID 1122 is determined for the current vibration sample, the group ID 1122 is used to extract the set of representative templates associated from the group as provided from the set of representative templates for each group 1121 constructed in the learning phase. The templates associated with the group ID are then provided to a correlation process 1124. The correlation process is configured to calculate the correlation between the provided sample 1102 and each template from the representative set of templates associated with each group at 1124. The reference template having the highest correlation is then selected as the reference template at 1125.

FIG. 12 illustrates an example flow for template selection, in accordance with an example implementation. Specifically, FIG. 12 illustrates the process for template selection 1105 which is utilized to generate a set of representative templates for each group 1121. At first, template selection 1105 receives the groups of vibration samples 1104 as operating during the normal period and conducts an iterative process for each group of vibration samples at 1202. The first sample is included into the template set 1205 as a baseline at 1203. Then, a determination is made as to whether there are remaining samples in the group to be processed at 1204. If so (Yes), then the flow proceeds to 1206, otherwise (No), then the current group is finished at 1207-1.

At 1206, the next vibration sample in the group is read. At 1208, a correlation is calculated between the vibration sample to be processed with the vibration samples included in the template set 1205. The highest correlation value is then used to determine if the vibration sample to be processed is below a threshold for inclusion in the template set at 1209. In an example implementation, the threshold can be set to 0.9, however, it can be any value in accordance with the desired implementation. If the vibration sample meets the threshold (Yes), then the flow proceeds to 1210 to include the processed sample into the current template set 1205 and then the flow proceeds to 1204 to process the next sample. Otherwise (No) the flow proceeds to 1211 to discard the current processed sample, and then proceeds to 1204 to process the next sample.

If the current group is finished 1207-1, a determination is made as to whether there are more remaining groups of samples at 1207-2. If so, the next group of samples is read at 1207-3 and the process repeats back to 1202. Otherwise (No) the set of representative templates is outputted for each group at 1211.

Some portions of the detailed description are presented in terms of algorithms and symbolic representations of operations within a computer. These algorithmic descriptions and symbolic representations are the means used by those skilled in the data processing arts to convey the essence of their innovations to others skilled in the art. An algorithm is a series of defined steps leading to a desired end state or result. In example implementations, the steps carried out require physical manipulations of tangible quantities for achieving a tangible result.

Unless specifically stated otherwise, as apparent from the discussion, it is appreciated that throughout the description, discussions utilizing terms such as "processing," "computing," "calculating," "determining," "displaying," or the like, can include the actions and processes of a computer system or other information processing device that manipulates and transforms data represented as physical (electronic) quantities within the computer system's registers and memories into other data similarly represented as physical quantities within the computer system's memories or registers or other information storage, transmission or display devices.

Example implementations may also relate to an apparatus for performing the operations herein. This apparatus may be specially constructed for the required purposes, or it may include one or more general-purpose computers selectively activated or reconfigured by one or more computer programs. Such computer programs may be stored in a computer readable medium, such as a computer-readable storage medium or a computer-readable signal medium. A computer-readable storage medium may involve tangible mediums such as, but not limited to optical disks, magnetic disks, read-only memories, random access memories, solid state devices and drives, or any other types of tangible or non-transitory media suitable for storing electronic information. A computer readable signal medium may include mediums such as carrier waves. The algorithms and displays presented herein are not inherently related to any particular computer or other apparatus. Computer programs can involve pure software implementations that involve instructions that perform the operations of the desired implementation.

Various general-purpose systems may be used with programs and modules in accordance with the examples herein, or it may prove convenient to construct a more specialized apparatus to perform desired method steps. In addition, the example implementations are not described with reference to any particular programming language. It will be appreciated that a variety of programming languages may be used to implement the teachings of the example implementations as described herein. The instructions of the programming language(s) may be executed by one or more processing devices, e.g., central processing units (CPUs), processors, or controllers.

As is known in the art, the operations described above can be performed by hardware, software, or some combination of software and hardware. Various aspects of the example implementations may be implemented using circuits and logic devices (hardware), while other aspects may be implemented using instructions stored on a machine-readable medium (software), which if executed by a processor, would cause the processor to perform a method to carry out implementations of the present application. Further, some example implementations of the present application may be performed solely in hardware, whereas other example implementations may be performed solely in software. Moreover, the various functions described can be performed in a single unit, or can be spread across a number of components in any number of ways. When performed by software, the methods may be executed by a processor, such as a general purpose computer, based on instructions stored on a computer-readable medium. If desired, the instructions can be stored on the medium in a compressed and/or encrypted format.

Moreover, other implementations of the present application will be apparent to those skilled in the art from consideration of the specification and practice of the teachings of the present application. Various aspects and/or components of the described example implementations may be used singly or in any combination. It is intended that the specification and example implementations be considered as examples only, with the true scope and spirit of the present application being indicated by the following claims.

What is claimed is:

1. A method, comprising:
   receiving vibration sensor data for a moving equipment configured to conduct a plurality of tasks;
   conducting feature extraction on the vibration sensor data to calculate the similarity coefficients between the vibration sensor data and a plurality of templates;
   inputting the similarity coefficients to a predictive maintenance model for the plurality of tasks, the predictive maintenance model configured to provide one or more of fault detection, failure prediction, and remaining useful life (RUL) estimation;
   wherein the conducting feature extraction on the vibration sensor data to calculate the similarity coefficients between the vibration sensor data and the plurality of templates comprises:
      selecting a reference template from the plurality of templates;
      conducting time-frequency decomposition on the reference templates and the vibration sensor data to generate component signals across a plurality of decomposition levels; and
      conducting similarity estimation on the component signals for each of the decomposition levels to generate similarity coefficients between the vibration sensor data and the reference template;
   wherein the plurality of templates are a group of templates selected from a plurality of groups generated from a clustering process, the group of templates selected based on a determination of the group from the plurality of groups having a nearest centroid to the vibration sensor data;
   wherein the plurality of tasks are identified by the clustering process.

2. The method of claim 1, further comprising, for each of the plurality of groups generated from the clustering process, selecting one or more samples from vibration data samples of the moving equipment operating at normal condition for utilization as the plurality of templates for the each of the plurality of groups.

3. The method of claim 2, wherein the selecting the one or more samples from vibration data samples of the moving equipment operating at normal condition for utilization as the plurality of templates for the each of the plurality of groups is based on a correlation of the one or more samples to other samples in the each of the plurality of groups.

4. The method of claim 1, wherein the selecting the reference template from the plurality of templates comprises calculating a correlation between the vibration sensor data and each of the plurality of templates, and selecting one of the plurality of templates having a highest correlation as the reference template.

5. The method of claim 1, wherein the moving equipment is a robotic arm.

6. A non-transitory computer readable medium, storing instructions for executing a process, the instructions comprising:
   receiving vibration sensor data for a moving equipment configured to conduct a plurality of tasks;
   conducting feature extraction on the vibration sensor data to calculate the similarity coefficients between the vibration sensor data and a plurality of templates;
   inputting the similarity coefficients to a predictive maintenance model for the plurality of tasks, the predictive maintenance model configured to provide one or more of fault detection, failure prediction, and remaining useful life (RUL) estimation;
   wherein the conducting feature extraction on the vibration sensor data to calculate the similarity coefficients between the vibration sensor data and the plurality of templates comprises:

selecting a reference template from the plurality of templates;

conducting time-frequency decomposition on the reference templates and the vibration sensor data to generate component signals across a plurality of decomposition levels; and conducting similarity estimation on the component signals for each of the decomposition levels to generate to similarity coefficients between the vibration sensor data and the reference template;

wherein the plurality of templates are a group of templates selected from a plurality of groups generated from a clustering process, the group of templates selected based on a determination of the group from the plurality of groups having a nearest centroid to the vibration sensor data;

wherein the plurality of tasks are identified by the clustering process.

7. The non-transitory computer readable medium of claim 6, the instructions further comprising, for each of the plurality of groups generated from the clustering process, selecting one or more samples from vibration data samples of the moving equipment operating at normal condition for utilization as the plurality of templates for the each of the plurality of groups.

8. The non-transitory computer readable medium of claim 7, wherein the selecting the one or more samples from vibration data samples of the moving equipment operating at the normal condition for utilization as the plurality of templates for the each of the plurality of groups is based on a correlation of the one or more samples to other samples in the each of the plurality of groups.

9. The non-transitory computer readable medium of claim 6, wherein the selecting the reference template from the plurality of templates comprises calculating a correlation between the vibration sensor data and each of the plurality of templates, and selecting one of the plurality of templates having a highest correlation as the reference template.

10. The non-transitory computer readable medium of claim 6, wherein the moving equipment is a robotic arm.

11. An apparatus communicatively coupled to a moving equipment configured to conduct a plurality of tasks the apparatus comprising:

a processor, configured to:

receive vibration sensor data for a moving equipment configured to conduct a plurality of tasks;

conduct feature extraction on the vibration sensor data to calculate the similarity coefficients between the vibration sensor data and a plurality of templates;

input the similarity coefficients to a predictive maintenance model for the plurality of tasks, the predictive maintenance model configured to provide one or more of fault detection, failure prediction, and remaining useful life (RUL) estimation;

wherein the processor is configured to conduct the feature extraction on the vibration sensor data to calculate the similarity coefficients between the vibration sensor data and the plurality of templates by:

selecting a reference template from the plurality of templates;

conducting time-frequency decomposition on the reference templates and the vibration sensor data to generate component signals across a plurality of decomposition levels; and conducting similarity estimation on the component signals for each of the decomposition levels to generate similarity coefficients between the vibration sensor data and the reference template;

wherein the plurality of templates are a group of templates selected from a plurality of groups generated from a clustering process, the group of templates selected based on a determination of the group from the plurality of groups having a nearest centroid to the vibration sensor data;

wherein the plurality of tasks are identified by the clustering process.

12. The apparatus of claim 11, wherein the processor is configured to, for each of the plurality of groups generated from the clustering process, select one or more samples from vibration data samples of the moving equipment operating at normal condition for utilization as the plurality of templates for the each of the plurality of groups.

13. The apparatus of claim 12, wherein the processor is configured to select the one or more samples from vibration data samples of the moving equipment operating at the normal condition for utilization as the plurality of templates for the each of the plurality of groups based on a correlation of the one or more samples to other samples in the each of the plurality of groups.

14. The apparatus of claim 11, wherein the processor is configured to select the reference template from the plurality of templates by calculating a correlation between the vibration sensor data and each of the plurality of templates, and selecting one of the plurality of templates having a highest correlation as the reference template.

15. The apparatus of claim 11, wherein the moving equipment is a robotic arm.

* * * * *